Nov. 12, 1968
J. A. KOOISTRA
3,410,380
CLUTCH AND BRAKE CONSTRUCTION FOR SPINNING AND TWISTING FRAMES
Filed May 18, 1967
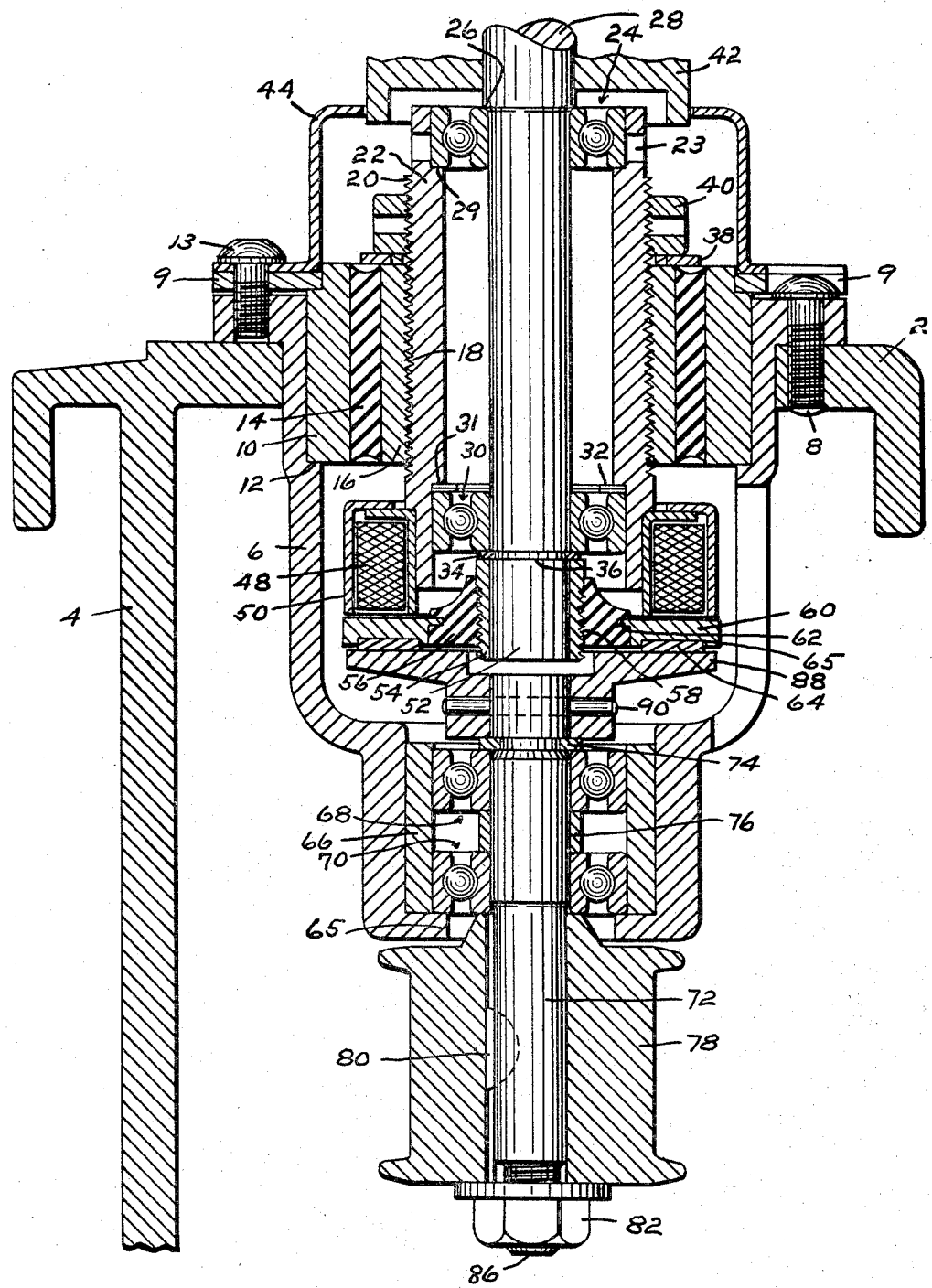
Inventor:
John A. Kooistra,
By Russell, Chittick & Pfund
Attorneys 3,410,380
CLUTCH AND BRAKE CONSTRUCTION FOR SPINNING AND TWISTING FRAMES
John A. Kooistra, North Andover, Mass., assignor to Davis & Furber Machine Company, North Andover, Mass., a corporation of Massachusetts
Filed May 18, 1967, Ser. No. 639,375
6 Claims. (Cl. 192—18)

ABSTRACT OF THE DISCLOSURE

This invention relates to a new type of clutch and brake to be located between a spindle and a driving shaft in a spinning or twisting frame whereby upon release of the clutch, the spindle will be immediately braked to a stop for doffing while the driving shaft continues in normal operation. The disengagement of the clutch and braking of the spindle is effected by an electromagnet surrounding the lower end of the spindle and located immediately above the clutch member. The electromagnet may be activated by manual operation of a switch by the operator or by automatic means set in motion upon the breaking of the yarn during the spinning or twisting.

Summary of the prior art

In the operation of a spinning frame, it is necessary from time to time to stop an individual spindle so that the full bobbin thereon may be removed and an empty bobbin placed on the spindle. The yarn must be pieced up and placed under the traveler of the spinning ring before the spindle is put back in operation. This result is customarily achieved by having individual braking means on each spindle. In the early forms, the brake stopped both the spindle and the driving pulley that was fixed to the lower end. The driving belt slipped on the pulley while the spindle was stopped. This, of course, was undesirable because of excessive wear on the pulley and driving belt.

In due course, the concept of a clutch mechanism between the driving shaft and the spindle was introduced. The prior art shows electromagnetic means surrounding the spindle for causing disengagement of the clutch and engagement of the brake.

However, in the various constructions of the prior art, problems of wear and vibration were inherent resulting in short life and corresponding increased expense in maintenance.

The present invention provides an electromagnetically operated clutch and brake so constructed that there is no axial movement of the spindle in relation to the driving shaft. The clutch member is made integral with the spindle but through the use of a flexible connection can be moved a limited axial distance from engaged position to braked position. Furthermore, any eccentricity that may develop in the lower end of the spindle due to the tendency of the spindle and package thereon to rotate about its center of gravity rather than about the true axis of the spindle can be absorbed by this new clutch construction acting in conjunction with the spindle bearing mounting.

Brief description of the drawing

The drawing consists of a single figure showing in cross section a portion of the spinning frame on which is mounted a spindle, the spindle bearing, the driving shaft that carries the driving pulley, and the clutch and brake mechanism whereby the spindle may be driven by the pulley actuated driving shaft and the spindle may be braked upon disengagement of the clutch upon actuation of the electromagnetic means.

Description of the preferred embodiment

On referring to the drawing, there is shown in cross section a portion of the spinning frame indicated at 2. The side of the frame 4 at the left is the side adjacent the operator.

The supporting structure for the drive shaft, spindle and related bearings comprises a depending bracket 6 secured to the frame in a conventional manner by bolts 8. In the upper part of bracket 6 is mounted the spindle bearing. This consists of a cylindrical member 10 fitting closely therein and resting on shoulder 12 and held firmly in position by a surrounding washer 9 and a plurality of bolts 13 one of which is shown. Within cylindrical member 10 is a rubber sleeve 14 and within this is another metal sleeve 16. Members 10, 14 and 16 are all bonded together so that sleeve 16 is held in fixed vertical position with respect to frame 2.

The interior of sleeve 16 is threaded as at 18. These threads are in engagement with the exterior threads 20 on bearing supporting sleeve 22. The upper end of sleeve 22 has spanner receiving holes 23 and carries a ball bearing 24, the inner race of which abuts against a shoulder 26 at the bottom of the main portion of the spindle 28 while the outer race sits on shoulder 29.

A second ball bearing 30 is mounted within the lower part of sleeve 22 and held in fixed position with respect to upper bearing 24 by virtue of the shoulder 31, the spacers 32 and snap ring 34 which fits within a groove 36 in spindle 28.

From the explanation thus far, it will be understood that rotation of sleeve 22 with respect to sleeve 16 will cause corresponding up or down adjustment of spindle 28. In order to hold sleeve 22 in any adjusted position, there is provided a washer 38 and a spanner actuated lock nut 40. The upper bearing 24 is covered and protected by the bobbin platform 42 which is in forced fit engagement with the spindle 28. The bobbin platform is broken away as it will be understood that everything thereabove including the upper portion of the spindle is conventional. The bearing mechanisms 24 and 30 are further protected against dirt by a cylindrical cover 44 which is secured to bracket 6 by the several bolts 13.

A cylindrical electromagnet 48 is mounted in fixed position on the lower end of sleeve 22. This electromagnet is of conventional construction and need not be described in detail. Leads go from the electromagnet to a switch connected to a source of power so that when the switch is actuated by the operator, the electromagnet will be energized. Each electromagnet on each spindle is individually controlled by its own switch. The electromagnet is encased in a housing 50 the bottom side of which is of annular configuration and acts as a braking surface. Alternatively, the electromagnet switch may be closed by other known means activated by the breaking of the yarn during the spinning operation.

Mounted on the extreme lower end 52 of spindle 28 is a short tube 54 which is in forced fit engagement therewith. This short tube 54 has thereon a cylindrical intermediate rubber element 56 which may be securely fixed thereto by molding it on the threaded exterior 58.

Element 56 has secured to its periphery a clutch and brake member 60 in the form of an annulus which preferably will have an interiorly extending flange 62 buried in tht rubber element 56. A ring of brake material 64 is preferably affixed in a circular shallow groove 65 on the underside of clutch member 60.

The construction just described of the tube 54, rubber intermediate element 56 and clutch and brake member 60 is such that it will be understood that member 60 is capable of slight vertical movement with respect to the lower end 52 of spindle 28. The extent and nature of this movement will be explained hereinafter.

The bottom end of bracket 6 has an inwardly extending shoulder 65 supporting thereon a sleeve 66 and upper and lower ball bearings 68 and 70 snugly fitting therewithin. These bearings are in fixed position on the upper portion of a short driving shaft 72, being axially located at the top by a snap ring 74 residing in a corresponding groove in the shaft, a spacer 76 and the top surface of the driving pulley 78. Pulley 78 is keyed to shaft 72 by key 80 and held in correct axial position against the bearings by the nut 82 which is screwed upwardly against washer 84 on the threaded shaft end 86.

The upper end of driving shaft 72 has rigidly secured thereon a driving clutch plate 88. This clutch plate may be readily affixed to the short shaft through a pinned connection as illustrated at 90. The upper face of plate 88 is preferably circular and flat and adapted to make suitable frictional engagement with the underside of the clutch insert 64.

*Mode of operation*

The parts heretofore described are adjusted in the following manner. With lock nut 40 loosened, the sleeve 22 is screwed downwardly to force the clutch and brake member 60 into sufficiently tight engagement with the upper face of clutch plate 88 so that rotation of pulley 78 will cause corresponding full load rotation of spindle 28. The lock nut is then tightened. It will be appreciated that in this adjusted position of clutch engagement the rubber insert 54 will be somewhat deformed but well within its elastic limit. When the member 60 is in its position of engagement with clutch plate 88, there will be a clearance between the topside of member 60 and the underside of electromagnet case 50 of approximately .010″. Upon energization of electromagnet 48, clutch and brake member 60 will move upwardly across the .010″ space to separate clutch insert 64 from the upper face of clutch plate 88 and to bring the upper face of member 60 into firm engagement with the bottom braking surface of the fixed case 50 of the electromagnet.

From the foregoing, it will be understood that when the electromagnet 48 is de-energized, the clutch will engage the constantly rotating shaft 72 to drive the spindle 28. As soon as the electromagnet 48 is energized, the clutch will be disengaged and the brake at the same time will be applied thus bringing spindle 28 to a halt. The driving shaft 72, however, continues its rotation driven by pulley 78.

As soon as the operator has doffed the bobbin, put in place the new bobbin and pieced up for continued operation, the electromagnet 48 is de-energized by manual opening of the switch whereupon the resilience of rubber element 56 forces clutch and brake member 60 downwardly to bring insert 64 into tight frictional engagement with clutch plate 88 whereupon rotation of spindle 28 is instantly resumed.

It will be appreciated from the foregoing explanation that at high speeds the spindle 28 and the growing package thereon will tend to rotate about their combined center of gravity. This may cause some slight eccentric movement of the lower end of the spindle. This movement, however, will be absorbed first by the rubber mounting sleeve 14 and secondly by the rubber intermediate element 56. Vibration that would otherwise be transmitted to the frame 2 is to a large extent avoided.

It is intended to cover all changes and modifications of the examples of the invention herein chosen for purposes of the disclosure which do not constitute departures from the spirit and scope of the invention.

I claim:

1. Driving and braking means for a spindle in a spinning frame, said means comprising a driving shaft mounted for rotation in bearings carried by said frame, a driving pulley fixed to said driving shaft, a driving clutch plate rigidly secured to the upper end of said driving shaft, a spindle above and aligned with said driving shaft and rotatably carried by bearings supported by said frame, a clutch and braking element mounted on the lower end of said spindle, said clutch and braking element comprising a driven annulus of magnetic material, said annulus connected to said spindle by a nonmetallic intermediate element made of elastic material, such as rubber, whereby said annulus is capable of movement to a limited extent in the direction of the axis of said spindle, said spindle normally spaced from said driving shaft a distance such that said driven annulus will be pressed by said intermediate element against said driving clutch plate with sufficient force to be driven thereby in nonslipping engagement and whereby said spindle will be driven by said pulley, an electromagnet fixed in vertical position with respect to said spindle and surrounding the lower portion of said spindle and being closely adjacent to the upper face of said annulus, said electromagnet, when energized, having sufficient electrical strength to overcome the downward force of said elastic intermediate material that holds said annulus normally against said driving clutch plate, thereby to raise said annulus and to cause disengagement of said annulus from said rotating driving clutch plate and to force the upper side of said annulus into engagement with a stationary braking surface located on the underside of said electromagnet.

2. The combination set forth in claim 1 and means for vertical adjustment of the spindle whereby the normal operating pressure of the said annulus against the driving clutch plate may be varied.

3. The combination set forth in claim 1 in which said driving shaft bearings are above said driving pulley.

4. The combination set forth in claim 1 in which a rubber mounting member is interposed between said spindle bearings and said frame.

5. The combination set forth in claim 1, said frame including a removable bracket in which are mounted the driving shaft and the spindle and the electromagnet whereby said bracket and associated parts may be removed from the frame as a unit.

6. The combination set forth in claim 1, said driving shaft bearing fixed with respect to said frame and said spindle bearing mounted in an elastic sleeve whereby the bottom end of the spindle, under the influence of a heavy package whose combined center of gravity is not at the spindle axis, may rotate eccentrically with respect to said driving shaft without affecting the driving efficiency of the clutch and without transmission of objectionable vibrations to said frame.

References Cited

UNITED STATES PATENTS

| | | | |
|---|---|---|---|
| 2,411,960 | 12/1946 | Dyer. | |
| 3,052,335 | 9/1962 | Sulger | 192—18.2 XR |
| 3,198,302 | 8/1965 | Janzen | 192—18.2 |
| 3,275,113 | 9/1966 | Hirano | 192—55 XR |
| 3,227,253 | 1/1966 | Becker et al. | 192—18.2 |

BENJAMIN W. WYCHE III, *Primary Examiner.*